(12) United States Patent
Cochran

(10) Patent No.: US 6,853,765 B1
(45) Date of Patent: Feb. 8, 2005

(54) MEMS OPTICAL SWITCH WITH THERMAL ACTUATOR

(75) Inventor: Kevin Cochran, Alexandria, VA (US)

(73) Assignee: The United States of America as represented by the Secretary of the Navy, Washington, DC (US)

(*) Notice: Subject to any disclaimer, the term of this patent is extended or adjusted under 35 U.S.C. 154(b) by 36 days.

(21) Appl. No.: 10/401,951

(22) Filed: Mar. 31, 2003

(51) Int. Cl.[7] .............................................. G02B 6/35
(52) U.S. Cl. ........................ 385/23; 359/107; 359/108
(58) Field of Search ........................ 385/16–19, 20–23

(56) References Cited

U.S. PATENT DOCUMENTS

| | | | |
|---|---|---|---|
| 4,946,236 A | 8/1990 | Dautartas et al. | 350/96.2 |
| 5,175,776 A * | 12/1992 | Lee | 385/16 |
| 5,446,811 A | 8/1995 | Field et al. | 385/23 |
| 6,360,036 B1 | 3/2002 | Couillard | 385/19 |
| 6,388,359 B1 * | 5/2002 | Duelli et al. | 310/309 |
| 2002/0102061 A1 | 8/2002 | Lang | 385/50 |

* cited by examiner

Primary Examiner—John D. Lee
Assistant Examiner—Jennifer Doan
(74) Attorney, Agent, or Firm—Mark Homer

(57) ABSTRACT

A MEMS type optical switch includes a substrate, the substrate including at least one groove formed therein; first and second optical fibers disposed in the at least one groove, the at least one groove including a widened portion for movement of at least one of the first and second optical fibers; a thermal actuator disposed adjacent one of the first and second optical fibers, the thermal actuator comprising at least one v-beam, a pair of anchors connected to ends of the v-beam, and a yoke disposed in a central portion of the v-beam.

7 Claims, 2 Drawing Sheets

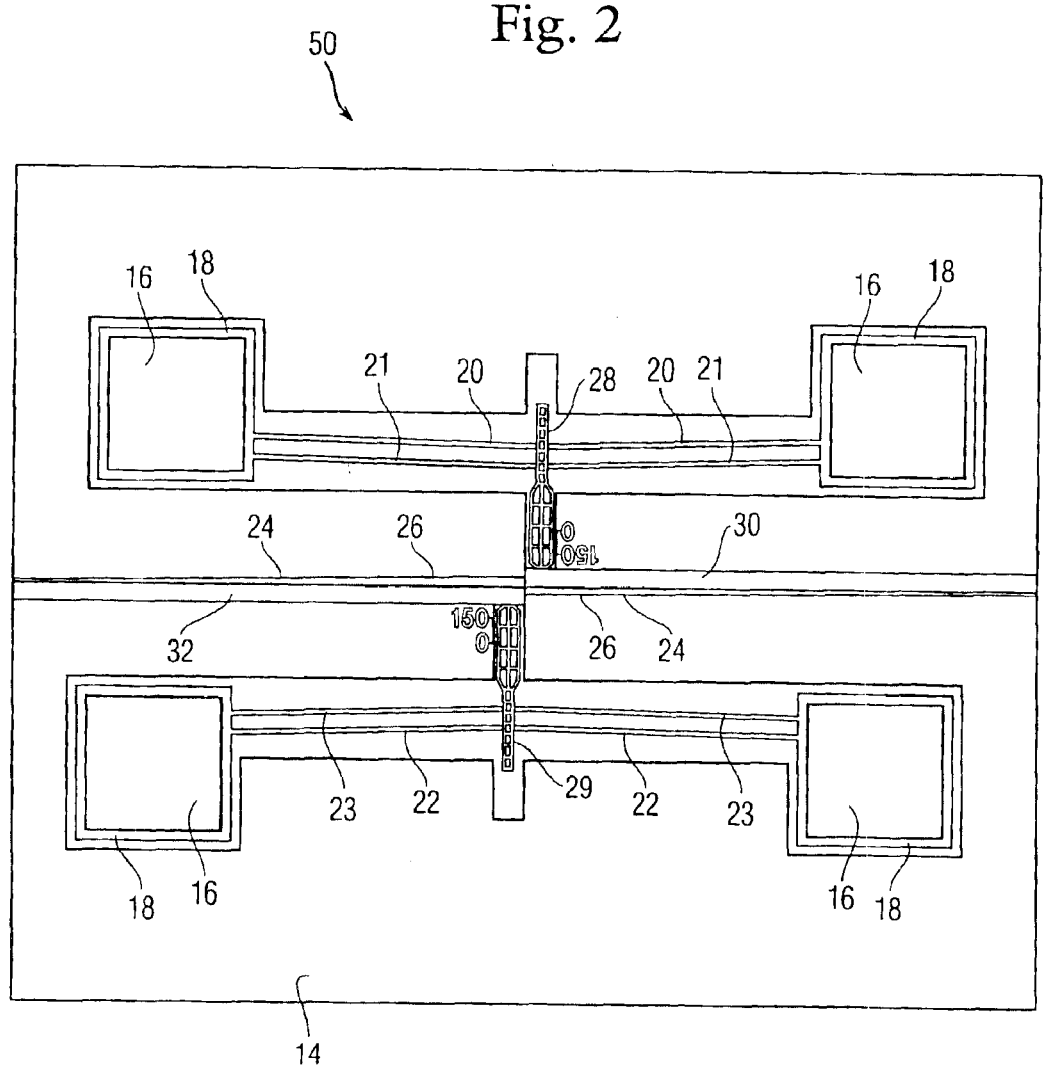

MEMS OPTICAL SWITCH WITH THERMAL ACTUATOR

STATEMENT OF GOVERNMENT INTEREST

The invention described herein may be manufactured and used by or for the Government of the United States of America for government purposes without the payment of any royalties therefor.

BACKGROUND OF THE INVENTION

The invention relates in general to microelectromechanical systems (MEMS) type optical switches and in particular to a MEMS optical switch using a thermal actuator.

Optical MEMS is a fairly new subject with many switch designs appearing in the past 5–6 years. Most MEMS optical switches work by actuating a slider in and out of the optical path between one or several input and output optical fibers. The slider acts in one of two ways. First, it could serve to block the light from entering the output optical fiber. Second, the slider could contain a reflector the redirects the light to the output fiber. Due to design and fabrication limitations, these switches are often very optically inefficient.

Many of these limitations can be overcome by directly actuating the input and/or output optical fibers in and out of line with each other to make for more efficient optical transfer. The major advantage of the moving fiber type optical switch is that the optical efficiency is greater than the moving reflector type switches. The surfaces used for micro-optical mirrors often are not very reflective and the input and output fibers must be placed at great distances from the reflector surface which further increases losses.

U.S. Patent Publication 2002/0102061 ('061) discloses an optical switch that is fabricated on a substrate and switches planar waveguides into and out of alignment with each other. A heat source (such as electrical resistance heating) may be used to provide heat to the movable structure. The heat causes thermal expansion of the movable structure and resulting movement of the waveguide into or out of alignment with another waveguide.

The '061 device uses waveguides. In general, optical fibers are more optically efficient than fabricated waveguides, optical fibers are cheaper to make than fabricated waveguides and optical fibers (larger diameter) can carry more power than waveguides. Also, in the '061 device, the movable waveguide is integrated into the thermal actuator. Because optical properties of materials are temperature dependent, the waveguides of the '061 device may be adversely affected by temperature increases in the thermal actuator.

SUMMARY OF THE INVENTION

It is an object of the invention to interrupt the optical power transfer between input and output optical fibers by directly actuating the fibers in and out of line with each other.

It is another object of the invention to provide an optical switch wherein the optical fibers are discrete from the thermal actuator, to thereby minimize adverse temperature effects.

The invention will be better understood, and further objects, features, and advantages thereof will become more apparent from the following description of the preferred embodiments, taken in conjunction with the accompanying drawings.

BRIEF DESCRIPTION OF THE DRAWINGS

In the drawings, which are not necessarily to scale, like or corresponding parts are denoted by like or corresponding reference numerals.

FIG. 2 is a top view of one embodiment of an optical switch according to the invention.

DETAILED DESCRIPTION OF THE PREFERRED EMBODIMENTS

In a moving fiber type optical switch, two optical fibers are placed in alignment channels on a chip surface. The optical fibers face each other and can be offset, depending on whether or not optical power transfer is desired in the unpowered state. An actuator for at least one of the optical fibers acts to push the fibers in or out of line with each other so that optical switching takes place.

Figure 1A:
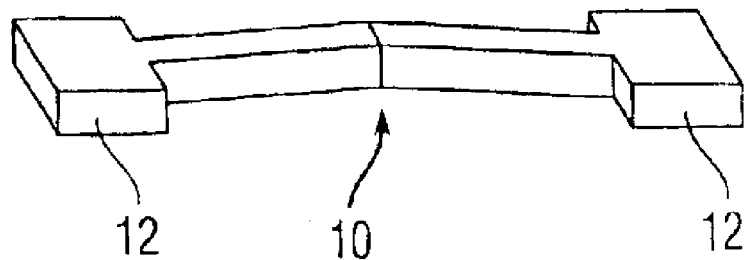
FIG. 1A is a perspective view of a v-beam in an off state.
Figure 1B:
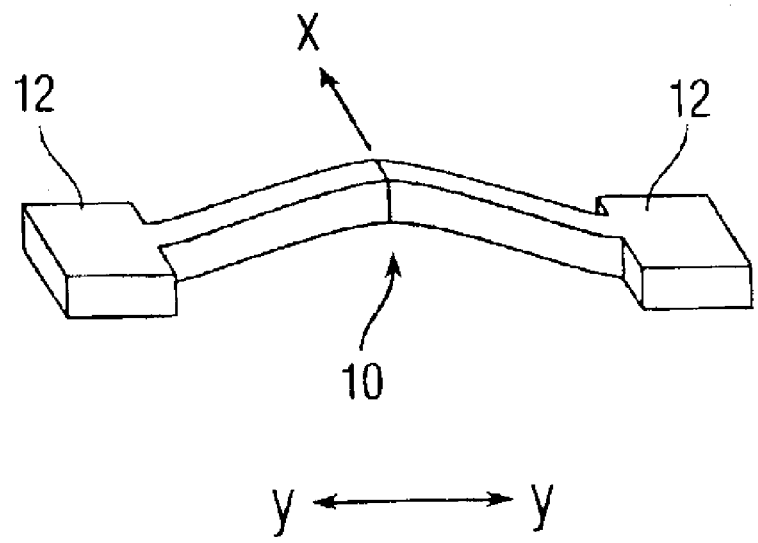
FIG. 1B is a perspective view of the v-beam of FIG. 1A in an on state.

FIGS. 1A and 1B illustrate the principle of operation of a v-beam thermal actuator. FIG. 1A is a perspective view of a v-beam 10 in an off state. FIG. 1B is a perspective view of the v-beam 10 of FIG. 1A in an on state. FIG. 1A shows a v-beam 10 connected at its ends to anchors 12. When an electrical current is applied to the v-beam 10 through the anchors 12, the v-beam increases in temperature because of resistance heating. The rising temperature of the v-beam 10 causes it to expand in the y-direction shown in FIG. 1B. However, because the v-beam is constrained by the anchors 12 in the y-direction, the v-beam deforms and displaces in the x-direction shown in FIG. 1B. When the electrical current is removed and the v-beam returns to its initial temperature, the v-beam 10 contracts and returns to the state of FIG. 1A.

FIG. 2 is a top view of one embodiment of an optical switch 50 according to the invention. In FIG. 2, the optical switch is in the off state, that is, optical fibers 30, 32 are out of alignment with each other. The components of switch 50 are mounted on a substrate 14, made of, for example, silicon. Substrate 14 has a groove 24 formed on a top surface thereof. The components of switch 50 and the groove 24 may be etched directly from substrate 14. Groove 24 includes a widened portion 26 that allows for movement of the optical fibers placed in the groove 24. A first optical fiber 30 may be, for example, an input fiber, and a second optical fiber 32 may be, for example, an output fiber. Optical fibers 30, 32 are placed in groove 24 with their ends offset from each other so that a signal from optical fiber 30 will not be passed to optical fiber 32. This is the off state of the switch 50.

Each optical fiber 30, 32 has a corresponding thermal actuator. The thermal actuator for fiber 30 includes anchors 18, v-beams 20, 21, and yoke 28. The thermal actuator for fiber 32 includes anchors 18, v-beams 22, 23 and yoke 29. Metal plating 16 on top of anchors 18 functions as an electrical contact to supply electrical power from a power supply (not shown) to the v-beams. The middle portions of v-beams 20, 21 are connected to yoke 28 and the middle portions of v-beams 22, 23 are connected to yoke 29. Anchors 18, v-beams 20, 21, 22, 23, and yokes 28, 29 are fabricated from a wafer using known MEMS fabrication techniques. Such techniques include DRIE and LIGA.

When optical switch 50 is in the on state, fiber 30 will be aligned with fiber 32 so that signals from fiber 30 will pass to fiber 32. Alignment of fibers 30, 32 is accomplished by applying electrical power across the four anchors 18. Electrical current flows through v-beams 20, 21 and 22, 23. As a result of resistance heating, the v-beams expand. Because the v-beams are anchored, the result of expansion is displacement of the v-beams and corresponding yokes in a direction toward respective optical fibers 30, 32. Yoke 28 contacts fiber 30 and pushes it in a downward direction as seen in FIG. 2. Yoke 29 contacts fiber 32 and pushes it in an upward direction as seen in FIG. 2. The net result of the displacement of the yokes 28, 29 is that the fibers 30, 32 become longitudinally aligned such that a signal from one fiber can pass through to the other fiber.

Turning off optical switch 50 results in fibers 30, 32 returning to the positions shown in FIG. 2. Optical switch 50 is turned off by cutting power to anchors 18. The v-beams contract as they cool, causing the yokes 28, 29 to move back to the positions shown in FIG. 2. The yokes 28, 29 are not connected to fibers 30, 32. However, as the yokes 28, 29 move away from fibers 30, 32, the elasticity of fibers 30, 32 causes the fibers to spring back to the unaligned or off position shown in FIG. 2. The switch 50 may be repeatedly turned on and off by respectively applying and cutting power to anchors 18 through plating 16.

Many variations of the power switch 50 shown in FIG. 2 are possible and are included in the scope of the invention. In switch 50, each of the thermal actuators is shown with two v-beams 20, 21 and 22, 23, respectively, However, a single v-beam could be used with each thermal actuator. A single v-beam would reduce the force applied by the yoke to the fiber. Also, more than two v-beams could be used with each thermal actuator to increase the force applied by the yoke to the fiber.

Another variation is to use a single thermal actuator to move only one of the fibers. That is, one of the fibers would remain fixed in both the on and off states of the switch. The fixed fiber would always be in the aligned position and would not require a thermal actuator. The other fiber would be movable from an out of line position to an aligned position by a thermal actuator.

While the invention has been described with reference to certain preferred embodiments, numerous changes, alterations and modifications to the described embodiments are possible without departing from the spirit and scope of the invention as defined in the appended claims, and equivalents thereof.

What is claimed is:

1. A MEMS type optical switch, comprising:

a substrate, the substrate including at least one groove formed therein;

first and second optical fibers disposed in the at least one groove, the at least one groove including a widened portion for movement of at least one of the first and second optical fibers;

a thermal actuator disposed adjacent one of the first and second optical fibers, the thermal actuator comprising at least one v-beam, a pair of anchors connected to ends of the v-beam, and a yoke disposed in a central portion of the v-beam.

2. The switch of claim 1 wherein the thermal actuator comprises a plurality of v-beams.

3. The switch of claim 1 further comprising a second thermal actuator disposed adjacent the other of the first and second optical fibers, the at least one groove including a widened portion for movement of both the first and second optical fibers.

4. The switch of claim 1 wherein the first and second optical fibers are aligned when the switch is in an on state and wherein the first and second optical fibers are out of line when the switch is in an off state.

5. The switch of claim 1 wherein the anchors include metal plating on a top surface thereof.

6. The switch of claim 1 wherein the yoke is separate from the optical fibers.

7. The switch of claim 1 wherein the substrate, anchors, v-beams and yoke comprise silicon.

* * * * *